Figures 1, 2:
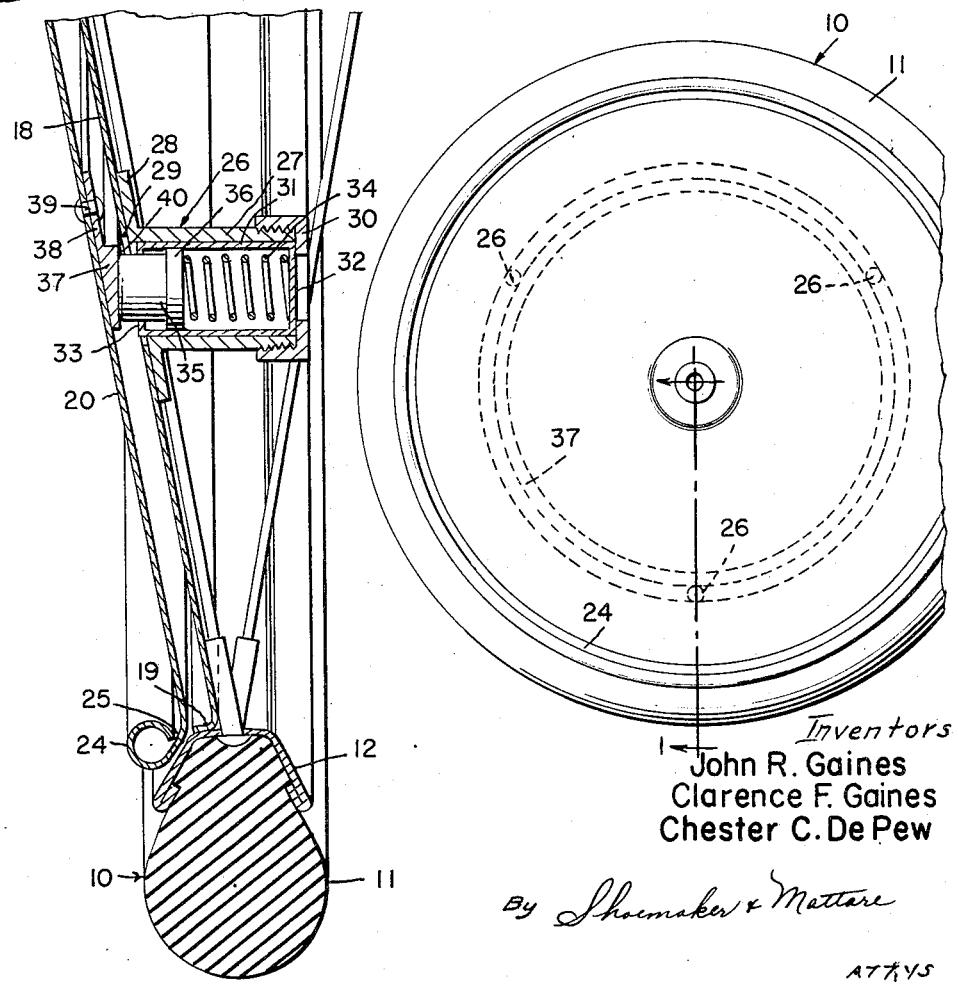

June 30, 1959  J. R. GAINES ET AL  2,892,514
COMBINED HANDICAPPING AND SAFETY DEVICE FOR SULKIES
Filed Dec. 31, 1956

Inventors
John R. Gaines
Clarence F. Gaines
Chester C. De Pew

By Shoemaker & Mattare
ATT*YS*

United States Patent Office 2,892,514
Patented June 30, 1959

2,892,514
COMBINED HANDICAPPING AND SAFETY DEVICE FOR SULKIES

John R. Gaines and Clarence F. Gaines, Sherburne, and Chester C. De Pew, Farmingdale, N.Y.; said John R. Gaines and De Pew assignors to said Clarence F. Gaines Application December 31, 1956, Serial No. 631,718

2 Claims. (Cl. 188—17)

This invention relates to a combination handicapping and safety device and pertains more particularly to an assemblage which serves simultaneously to protect and cover a sulky wheel, to protect a horse from catching his foot in the spokes of a sulky wheel, and act as a constant drag producing mechanism so as to introduce an artificially contrived handicap.

Normally, no means is provided for handicapping horses in sulky races and, sulky wheels conventionally are of the spoke type and no means is provided for protecting the spokes from damage which may be caused by the hoofs of a horse during a race and to protect the horse. Consequently, it is a primary object of this invention to provide a means which is at once effective to protect spoke wheels from damage and a horse from possible injury and at the same time to introduce a handicap by creating a constant frictional drag upon the wheels.

Another object of this invention is to provide a mechanism of the character above described wherein the handicapping mechanism is so constructed and arranged as to be readily altered to change the amount of handicap in accordance with a system devised for this purpose and similar to the handicapping system which is normally used in saddle racing.

More specifically, another object of this invention is to provide a disc-like covering device fixed to a sulky so as to cover the outer surface of an associated wheel with there being an annular ring fixed to the inner surface of such disc upon which a frictional element carried by the sulky wheel frictionally bears so that the disc, being stationary, cooperates with the friction producing means to impart a handicap as the sulky wheel is turned and produces a constant frictional drag thereon while at the same time the disc protectively covers the sulky wheel.

With the above and other objects in view, the invention consists in the construction and novel combination and arrangement of parts hereinafter fully described, illustrated in the accompanying drawing and pointed out in the claims hereto appended, it being understood that various changes in the form, proportions, and minor details of construction, within the scope of the claims, may be resorted to without departing from the spirit or sacrificing any of the advantages of the invention.

In the drawing:

Fig. 1 is an enlarged sectional view showing a conventional sulky wheel of the spoke type having the combined handicapping and safety device attached thereto and showing details of the internal construction of the latter; and Fig. 2 is a partial elevation showing a sulky wheel having the combined handicapping and safety device attached thereto.

Referring more particularly at this time to Fig. 1, the reference numeral 10 indicates generally the usual sulky wheel construction which embodies a rubber tire 11 mounted upon a rim 12 and carried by the hub 13 of the wheel by means of radially projecting spokes 14 attached between the hub and the rim in the usual and conventional manner as is shown. Rigidly carried by the sulky frame is an axle member 14a upon which the hub 13 of the wheel is journalled, the usual bearings 15 and 16 being employed and the wheel being retained upon the axle by means of the retaining nut 17, all as is conventional in such constructions. In Fig. 1, the left hand side of the wheel assembly is the outer side and rigidly fixed to the wheels and covering the major portion of the spokes is an annular plate 18 having an outer marginal flange 19 which fits within the rim 12 in the manner shown and is rigidly affixed thereto.

Also fixed from rotation and in covering relation to the outer side of the wheel is a protective disc member 20 which has its inner marginal edge 21 overlying a radial flange 22 integral with or fixed to the axle 14a with the inner portion 21 being rigidly fixed thereto as by the rivet members 23. A rigidifying or stiffening rib is formed on the outer periphery of the disc 20 as is indicated by the reference character 24 and although this rib may take many different forms, in the specific construction it is formed by rolling the marginal edge of the disc back upon itself in tubular fashion as is shown and the portion immediately adjacent thereto may be outwardly offset as indicated by the reference character 25 so as to lie in close proximity to and generally parallel to the adjacent portion of the wheel rim 12.

Rigidly fixed to the inner surface of the plate 18 are a series of equally distant circumferentially spaced drag producing assemblies indicated generally by the reference character 26. In the specific embodiment shown, there are three such assemblies 26 shown in dotted lines in Fig. 2 which are equally distantly spaced along a common circumferential line. As is shown most clearly in Fig. 2, each such assembly 26 incorporates an outer housing or body 27 of cylindrical form having on its inner side an outstanding flange 28 which is generally annular and disposed angularly with respect to the cylindrical body portion 27 so as to lie in face-to-face contact against the inner surface of the plate 18 and this flange is rigidly affixed thereto by any suitable means such as rivets, nuts and bolts or the like. At each point of attachment of one of the drag producing assemblies 26, the plate 18 is provided with an aperture or hole as indicated by the reference character 29 in Fig. 1. The inner or free end of the cylindrical body 27 is externally threaded and receives thereon a retaining cap 30 which serves to hold the working parts in place. Disposed within the cylindrical body 27 is a sleeve 31 having one end closed as indicated by the reference character 32 and having an inwardly projecting annular flange 33 at its other end. Received in turn within this sleeve is a compression spring 34 which bears at one end against the inner surface of the closure plate 32 and at its other end against a piston member 35. The piston member 35 is formed of a hard fibrous material such as the material which brake bands are normally made of and embodies an enlarged shoulder portion 36 which fits snugly within the sleeve 31 but is freely slidable therein and the reduced outer end portion of the piston is of a diameter to freely pass through the central opening defined by the flange 33 with the shoulder portion 36 preventing removal of the piston member.

Rigidly fixed to the inner surface of the disc 20 is an annular brake ring 37 which is provided with an inner flange portion 38 rigidly affixed to the disc 20 by means of rivets 39 or the like. The thickest portion of the brake ring is aligned with the openings in the plate 18 through which the drag producing pistons 35 project and these pistons 35 bear against the inner surface 40 of the brake ring. The springs 34, of course, are compressed when the assemblage is in place and produce a predetermined bearing force of the pistons 35 against the brake ring to produce a predetermined drag upon the sulky wheel as the sulky is moved.

The drag characteristics may be readily altered by removing the retaining caps 30 and the associated sleeve, spring and piston assemblies and introducing a different assembly into the cylindrical housing 27 which embodies a heavier or lighter compression spring 34 to correspondingly increase or decrease the predetermined amount of drag produced and thus alter the handicap characteristics in the particular sulky involved.

Thus, it will be seen that there is produced in combination a protective device preventing the hoofs of horses from becoming entangled in the spokes of a sulky wheel and thus causing damage not only to the sulky wheel but perhaps to the horses also and in combination therewith, a device for creating a predetermined amount of drag or resistance to movement of the sulky which may form the basis of a handicap system in sulky racing.

We claim:

1. In combination with a sulky having a fixed axle and a wheel rotatably mounted upon said axle, a disc mounted rigidly on said axle and overlying one side of said wheel in close proximity thereto forming a protective covering for the wheel, a brake ring fixed to the inner surface of said disc and facing said wheel, and friction means carried by said wheel bearing upon said brake ring for maintaining a constant fixed frictional drag on and resisting rotation of said wheel while the wheel is turning, said friction means including a plurality of cylinders carried by said wheel, a sleeve disposed within each cylinder having a closure member at one end and an inwardly projecting flange at its other end, a compression spring disposed within said sleeve and seating at one end on said closure member, a plunger disposed within said sleeve bearing against the other end of said spring and projecting from the sleeve into engagement with said brake ring and having an enlarged shoulder slidably contacting the inner surface of said sleeve and presenting a forward face engageable with said flange to prevent removal of the plunger and spring from the sleeve.

2. In combination with a racing sulky having a fixed axle and a wheel rotatably journalled thereon, an annular plate fixed to one side of said wheel, an annular disc rigid with said axle and disposed in spaced relation to and on the same side of the wheel as said plate to protectively cover said one side of the wheel, a brake ring fixed to said disc and facing said plate, and means carried by said plate in frictional contact with said brake ring to impart a rotation restricting drag upon said wheel, said means including a plurality of cylinders fixed to said plate, a sleeve disposed within each cylinder having a closure member at one end and an inwardly projecting flange at its other end, a compression spring disposed within said sleeve and seating at one end on said closure member, a plunger disposed within said sleeve bearing against the other end of said spring and projecting from the sleeve into engagement with said brake ring and having an enlarged shoulder slidably contacting the inner surface of said sleeve and presenting a forward face engageable with said flange to prevent removal of the plunger and spring from the sleeve.

References Cited in the file of this patent

UNITED STATES PATENTS

| 767,299 | MacDonald | Aug. 9, 1904 |
| 1,628,559 | Showers | May 10, 1927 |
| 2,249,297 | Muffett | July 15, 1941 |
| 2,384,561 | Muffett | Sept. 11, 1945 |
| 2,612,968 | Hood | Oct. 7, 1952 |
| 2,659,458 | Mercier | Nov. 17, 1953 |
| 2,769,664 | Cornelius | Nov. 6, 1956 |